Patented Dec. 29, 1936

2,066,180

UNITED STATES PATENT OFFICE 2,066,180

PRODUCTION OF PROTECTIVE COATING ON ALUMINUM AND NONCUPROUS ALLOYS THEREOF

Edwin Cecil Frederick King, Brentford-Middlesex, England, assignor to Pyrene Manufacturing Company, Newark, N. J., a corporation of Delaware No Drawing. Application June 18, 1935, Serial No. 27,208. In Great Britain July 13, 1934

25 Claims. (Cl. 148—6)

The present invention relates to a process of and composition for use in producing protective or paint-holding coatings on aluminum and non-cuprous alloys thereof, and has for its general object to improve the protective or paint-holding properties of such coatings.

It is already known that protective films can be formed on non-cuprous aluminum-containing articles by treatment with a solution of an alkali metal carbonate and an alkali metal chromate. According to the invention, denser and harder films are produced by making certain additions to solutions which essentially comprise such carbonates and chromates. These additions comprise broadly the neutral salts of an alkali metal and those carbonates of a metal electro-positive with respect to aluminum, including basic carbonates, which do not react with any of the other constituents of the solution. Any one or more of these substances may be employed in the solution, the first-mentioned group of substances, namely, the neutral salts of an alkali metal, being claimed separately in divisional application Serial No. 27,209, filed concurrently herewith.

Examples of suitable neutral salts of alkali metals are sodium monohydrogen phosphate, sodium chloride and sodium nitrate, while examples of suitable metallic carbonates are chromium carbonate, and the carbonates of nickel, aluminum, cobalt, manganese and titanium. Iron carbonate reacts with the sodium carbonate in the solution and is therefore not suitable. Although the invention is not to be held limited in any way by any particular theory to account for the effects observed, it is believed that the function of the neutral alkali metal salt is to buffer the solution and thus prevent the hydrogen ion concentration from fluctuating excessively, keeping it within narrow limits and thereby insuring more uniform results. These salts do not enter into the composition of the final coating, and potassium or sodium salts may be used indiscriminately. The metallic carbonates used, on the other hand, do affect the composition of the final coating obtained. The alkali metal salt is added to the solution in small amounts, preferably such that its total content in the solution is between 0.25 and 0.5%, and it should not exceed 1%, while the metallic carbonate is preferably added in amounts such that the dry material or powder used to form the solution contains from 3 to 8% of metallic carbonate and preferably 5%, the solution then being formed by dissolving 7.5 parts of the powder in 100 parts of water. It is difficult to ascertain the amount of metallic carbonate actually present in solution, because in practice such substance is found to precipitate as sludge.

Particularly good results are obtained when chromium carbonate is employed, as this compound serves to give an especially hard and dense film and also helps to maintain the soluble chromium content of the solution.

The solutions according to the present invention are best worked at a temperature between 90 and 100° C., but it is possible to reduce the working temperature by addition of caustic soda and by increasing the concentration of the constituents.

In order that the invention may be clearly understood and readily carried into effect, some examples will now be given of its application.

Example I

The aluminum article to be coated may if desired be first cleaned by degreasing with trichlorethylene or the like, and is then treated for 3 to 5 minutes in a bath kept at boiling temperature and prepared by dissolving in 100 parts by weight of water 9 parts by weight of the following composition:

| | Parts by weight |
|---|---|
| Sodium carbonate | 72.7 |
| Sodium chromate | 24.2 |
| Sodium monohydrogen phosphate | 3.0 |

After this treatment the article is rinsed in hot water. It is then ready for use for the reception of paints, lacquers, enamels and the like, or alternatively the treated surface may be further protected by treatment with a substance such as lanoline.

Example II

The conditions are the same as in Example I, but the bath is prepared by dissolving in 100 parts of water 7.8 parts of a powder having the following composition:

| | Parts by weight |
|---|---|
| Sodium carbonate | 69.4 |
| Sodium chromate | 23.6 |
| Chromium carbonate | 7 |

Example III

The temperature of treatment is reduced to 70° C. by the use of a bath prepared by dissolving in 100 parts of water 11.5 parts of a powder having the following composition:

| | Parts by weight |
|---|---|
| Sodium carbonate | 67.9 |
| Sodium chromate | 22.3 |
| Sodium hydroxide | 4.9 |
| Chromium carbonate | 4.9 |

The treatment is otherwise similar to that described in Example I.

Broadly speaking the powder used to make up the bath initially should have a composition such that 100 parts by weight of the powder contain:

| | Parts |
|---|---|
| Anhydrous sodium carbonate | 40 to 80 |
| Anhydrous sodium chromate | 52 to 15 |
| Metallic carbonate | 3 to 8 |

A particular example of such a powder which is found to give good results is the following:

| | Parts |
|---|---|
| Anhydrous sodium carbonate | 71.4 |
| Anhydrous sodium chromate | 21.4 |
| Chromium carbonate | 7.2 |

The bath is prepared from the powder specified by dissolving 5 to 25 parts in 100 parts of water. Since the chromate is used up at a greater rate than the carbonate during the working of the bath, the replenishing powder or dry material to be added for replenishing the bath needs to contain a larger proportion of chromate than the initial powder. Accordingly the composition of the replenishing powder is as follows:

| | Parts |
|---|---|
| Anhydrous sodium carbonate | 35 to 65 |
| Anhydrous sodium chromate | 57 to 30 |
| Metallic carbonate | 3 to 8 |

A preferred composition of the replenishing powder is as follows:

| | Parts |
|---|---|
| Anhydrous sodium carbonate | 57.6 |
| Anhydrous sodium chromate | 35.2 |
| Chromium carbonate | 7.2 |

A sufficient quantity of a neutral alkali metal salt may be added both to the initial make-up powder and to the replenishing powder to maintain a concentration in the bath which lies preferably between 0.25 and 0.5% and which should not exceed 1%.

Baths according to the invention may be used for applying films or coatings both to aluminum and non-cuprous alloys containing a substantial proportion of aluminum. The resultant films or coatings provide more satisfactory bases for holding paint or may be dyed more uniformly than films produced by baths without additions according to the invention.

It is desired to have it understood that the process which has been described is subject to various modifications without departing from the spirit of the invention. Thus, while the invention is particularly applicable to coating by immersion in baths, the constituents may be made up into a paste which may be sprayed or brushed onto the surface of the article to be treated.

What is claimed is:

1. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, and a carbonate of a metal electro-positive with respect to aluminum which does not react with any of the other constituents of the composition.

2. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, and chromium carbonate.

3. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, a neutral salt of an alkali metal, and a carbonate of a metal electro-positive with respect to aluminum which does not react with any of the other constituents of the composition, the concentration of the neutral alkali metal salt being maintained at a value not exceeding 1%.

4. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, sodium monohydrogen phosphate, and a carbonate of a metal electro-positive with respect to aluminum which does not react with any of the other constituents of the composition, the concentration of sodium monohydrogen phosphate being maintained at a value not exceeding 1%.

5. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, a neutral salt of an alkali metal, and chromium carbonate, the concentration of the neutral alkali metal salt being maintained at a value not exceeding 1%.

6. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, sodium monohydrogen phosphate, and chromium carbonate, the concentration of sodium monohydrogen phosphate being maintained at a value not exceeding 1%.

7. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, a neutral salt of an alkali metal, and a carbonate of a metal electro-positive with respect to aluminum which does not react with any of the other constituents of the composition, the concentration of the neutral alkali metal salt being maintained between 0.25 and 0.5%.

8. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, sodium monohydrogen phosphate, and a carbonate of a metal electro-positive with respect to aluminum which does not react with any of the other constituents of the composition, the concentration of the sodium monohydrogen phosphate being maintained between 0.25 and 0.5%.

9. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, a neutral salt of an alkali metal, and chromium carbonate, the concentration of the neutral alkali metal salt being maintained between 0.25 and 0.5%.

10. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, sodium monohydrogen phosphate, and chromium carbonate, the concentration of the sodium monohydrogen phosphate being maintained between 0.25 and 0.5%.

11. A bath for use in the production of protective or paint-holding coatings on aluminum and non-cuprous alloys thereof, which comprises in aqueous solution an alkali metal carbonate, an alkali metal chromate, and a relatively small quantity of a carbonate of a metal electro-positive with respect to aluminum which does not react with any of the other constituents of the bath.

12. A bath for use in the production of protective or paint-holding coatings on aluminum and non-cuprous alloys thereof, which comprises in aqueous solution an alkali metal carbonate, an alkali metal chromate, and a relatively small quantity of chromium carbonate.

13. A bath for use in the production of protective or paint-holding coatings on aluminum and non-cuprous alloys thereof, which comprises in aqueous solution an alkali metal carbonate, an alkali metal chromate, a neutral salt of an alkali metal in quantity corresponding to a concentration not exceeding 1%, and a relatively small quantity of a carbonate of a metal electro-positive with respect to aluminum which does not react with any of the other constituents of the bath.

14. A bath for use in the production of protective or paint-holding coatings on aluminum and non-cuprous alloys thereof, which comprises in aqueous solution an alkali metal carbonate, an alkali metal chromate, sodium monohydrogen phosphate in a quantity corresponding to a concentration not exceeding 1%, and a relatively small quantity of a carbonate of a metal electro-positive with respect to aluminum which does not react with any of the other constituents of the bath.

15. A bath for use in the production of protective or paint-holding coatings on aluminum and non-cuprous alloys thereof, which comprises in aqueous solution an alkali metal carbonate, an alkali metal chromate, a neutral salt of an alkali metal in quantity corresponding to a concentration not exceeding 1%, and a relatively small quantity of chromium carbonate.

16. A bath for use in the production of protective or paint-holding coatings on aluminum and non-cuprous alloys thereof, which comprises in aqueous solution an alkali metal carbonate, an alkali metal chromate, sodium monohydrogen phosphate in quantity corresponding to a concentration not exceeding 1%, and a relatively small quantity of chromium carbonate.

17. A bath for use in the production of protective or paint-holding coatings on aluminum and non-cuprous alloys thereof, which comprises in aqueous solution an alkali metal carbonate, an alkali metal chromate, a neutral salt of an alkali metal in quantity corresponding to a concentration of from 0.25 to 0.5%, and in relatively small quantity a carbonate of a metal electro-positive with respect to aluminum which does not react with any of the other constituents of the bath.

18. A bath for use in the production of protective or paint-holding coatings on aluminum and non-cuprous alloys thereof, which comprises in aqueous solution an alkali metal carbonate, an alkali metal chromate, sodium monohydrogen phosphate in quantity corresponding to a concentration of from 0.25 to 0.5%, and in relatively small quantity a carbonate of a metal electro-positive with respect to aluminum which does not react with any of the other constituents of the bath.

19. A bath for use in the production of protective or paint-holding coatings on aluminum and non-cuprous alloys thereof, which comprises in aqueous solution an alkali metal carbonate, an alkali metal chromate, a neutral salt of an alkali metal in quantity corresponding to a concentration of from 0.25 to 0.5%, and in relatively small quantity chromium carbonate.

20. A bath for use in the production of protective or paint-holding coatings on aluminum and non-cuprous alloys thereof, which comprises in aqueous solution an alkali metal carbonate, an alkali metal chromate, sodium monohydrogen phosphate in quantity corresponding to a concentration of from 0.25 to 0.5%, and in relatively small quantity chromium carbonate.

21. A powder for use in making up a bath in the production of protective or paint-holding coatings on aluminum and non-cuprous alloys thereof, which comprises 40 to 80 parts by weight of anhydrous sodium carbonate, 52 to 15 parts by weight of sodium chromate, and 3 to 8 parts by weight of a metallic carbonate of a metal electro-positive with respect to aluminum which does not react in the bath with any of the other constituents.

22. A powder for use in making up a bath in the production of protective or paint-holding coatings on aluminum and non-cuprous alloys thereof, which comprises 40 to 80 parts by weight of anhydrous sodium carbonate, 52 to 15 parts by weight of sodium chromate, a neutral salt of an alkali metal in quantity sufficient to maintain a concentration in the bath not exceeding 1%, and 3 to 8 parts by weight of a carbonate of a metal electro-positive with respect to aluminum which does not react in the bath with any of the other constituents.

23. A bath-replenishing powder for use in the production of protective or paint-holding coatings on aluminum and non-cuprous alloys thereof, which comprises 35 to 65 parts by weight of anhydrous sodium carbonate, 57 to 30 parts by weight of anhydrous sodium chromate, and 3 to 8 parts by weight of a carbonate of a metal electro-positive with respect to aluminum which does not react in the bath with any of the other constituents.

24. A bath-replenishing powder for use in the production of protective or paint-holding coatings on aluminum and non-cuprous alloys thereof, which comprises 35 to 65 parts by weight of anhydrous sodium carbonate, 57 to 30 parts by weight of anhydrous sodium chromate, a neutral salt of an alkali metal in quantity sufficient to maintain a concentration in the bath not exceeding 1%, and 3 to 8 parts by weight of a carbonate of a metal electro-positive with respect to aluminum which does not react in the bath with any of the other constituents.

25. The process of producing protective or paint-holding coatings on aluminum and non-cuprous alloys thereof, which comprises treating the non-cuprous aluminum-containing article to be coated with an aqueous composition containing an alkali metal carbonate, an alkali metal chromate, sodium hydroxide, and a carbonate of a metal electro-positive with respect to aluminum which does not react with any of the other constituents of the composition.

EDWIN CECIL FREDERICK KING.